D. LANE.
Saw-Mill Dog.
No. 203,469.  Patented May 7, 1878.
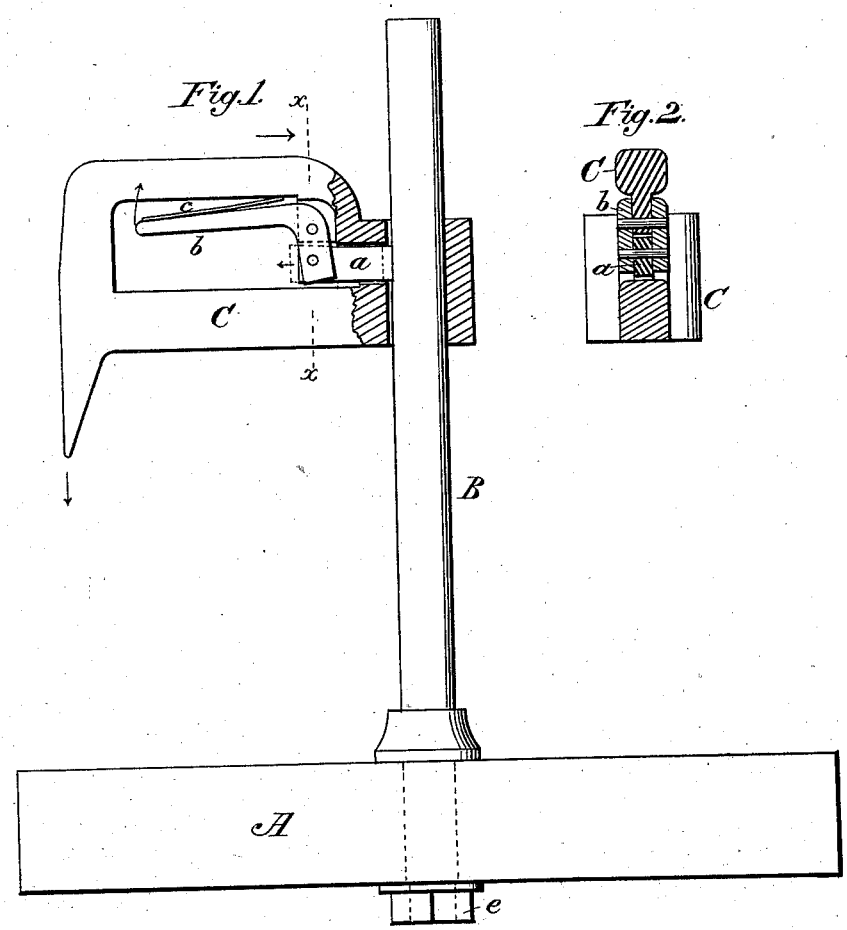

UNITED STATES PATENT OFFICE.

DENNIS LANE, OF MONTPELIER, VERMONT.

IMPROVEMENT IN SAW-MILL DOGS.

Specification forming part of Letters Patent No. 203,469, dated May 7, 1878; application filed April 25, 1878.

*To all whom it may concern:*

Be it known that I, DENNIS LANE, of Montpelier, in the county of Washington and State of Vermont, have invented certain new and useful Improvements in Saw-Mill Dogs; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of this invention is to improve that class of dogs used upon the head-blocks of saw-mills, for the purpose of holding a log or cant in position while being operated upon by the saw; and the invention consists in so constructing the dog that it shall remain stationary at any point upon its supporting-standard until released by the operator, as will be hereinafter fully set forth, and specifically pointed out in the claim.

In the drawings, Figure 1 represents a side view of the dog, being partly in section, so as to show the holding-pawl by which it is retained in position upon the standard. Fig. 2 is a section of the dog upon the line $x\,x$ of Fig. 1.

A represents one of the head-blocks or the setting-beam of a saw-mill carriage, into which is secured the vertical standard B by means of the nut $e$, screwed upon its lower end, or by such other suitable means as will retain it in position firmly. The upper part of this standard, above the head-block or setting-beam, is formed of circular section, and perfectly straight and true, so that the dog C will move easily up and down to any point in its length. This dog is constructed in its general features like the one for which Letters Patent No. 177,943 were granted to me on the 30th day of May, 1876, being, like that, provided with a sharp point to enter and hold the log, a hand-opening, a lever, and its sustaining-spring. But here the likeness terminates, for, instead of the sectional nut used to secure the dog in position upon a screw-threaded standard by engaging with the screw-thread, as in that case, a pawl, $a$, is provided, actuated by a lever, $b$, and spring $c$, which pawl, by impinging against the smooth surface of the standard B, holds the dog in any desired position with sufficient tenacity to accomplish all useful results, thus reducing the wearing-surfaces of the parts, and enabling the manufacturer to produce an equally efficient dog at a much less price.

The method of operation is as follows: A log or cant being placed upon the head-blocks, the operator seizes the handle of the dog; his fingers, coming in contact with the lever $b$, raise it, and withdraw the pawl $a$ out of contact with the standard. The dog will then slide up or down readily, and, if forced down, its weight, together with the impulse given it, will cause the point of the dog to enter the log sufficiently to hold it firmly in position, when the operator releases his hold, thus allowing the lever to drop and force the pawl against the standard, which binds the dog, and prevents movement in any direction until it is released by withdrawing the pawl, as before stated.

Having thus described my invention, I claim as new, and desire to secure by Letters Patent, the following:

The saw-mill dog hereinbefore described, consisting of the smooth-surfaced vertical standard, in combination with the spring-acted smooth-surfaced pawl, for holding the dog in position upon the standard, as set forth.

In testimony that I claim the foregoing as my own I hereunto affix my signature in presence of two witnesses.

DENNIS LANE.

Witnesses:
    E. M. GUERNSEY,
    C. P. PITKIN.